United States Patent Office 3,579,419
Patented May 18, 1971

3,579,419
TREATMENT OF FLUFFED PULP FIBERS WITH GASEOUS CHLORINE
Frederic H. Yorston, Montreal, Quebec, and Norman Liebergott, Chomedey, Laval, Quebec, Canada, assignors to Pulp and Paper Research Institute of Canada, Pointe Claire, Quebec, Canada
Filed Apr. 24, 1967, Ser. No. 633,292
Int. Cl. D21c 9/12
U.S. Cl. 162—66                                        6 Claims

ABSTRACT OF THE DISCLOSURE

The invention is directed to treating a solid, such as wood pulp in the form of fluff, with a gaseous reactant such as chlorine. The fluff is first passed through a zone containing the gas. The residence time is limited to such that less than the potential amount of the gas is acquired by the fluff. Then the fluff including the acquired gas is allowed to remain in a zone free of the treating gas for a length of time sufficient to permit the acquired gas to react with the fluff.

---

This invention relates to a process for the treatment of material with a fluid. More particularly it relates to a process for the treatment of vegetable matter with a gas. Most advantageously, it is directed to a process for the treatment of vegetable matter for the removal of lignin and other encrustants therefrom.

In the removal of lignin and other encrustants from vegetable matter, the first step in purification, usually following a digestion stage, almost invariably consists in a treatment of the material with elemental chlorine. This chlorination stage is conventionally carried out with the vegetable matter, for instance wood pulp, in aqueous suspension and the chlorine placed in solution, by one means or another, in the aqueous phase. This operation constitutes the first step in almost all pulp bleaching processes.

This manner of proceeding has the disadvantages of requiring relatively low concentrations of the vegetable matter in the aqueous medium, and low concentrations of chlorine in solution, both resulting in a low rate of reaction. This, in turn, requires large equipment, a large quantity of material in process and can lead to poor uniformity of treatment and difficulty of control. Moreover, in spite of relatively long reaction time, the chlorine supplied is not always exhausted; no effective method of recovery of unreacted chlorine is known, so that some chlorine wastage results.

Procedures have therefore been contemplated for the improvement of such procedure by the regulation of the ratio of pulp to chlorine. One such prior procedure is set forth in U.S. Pat. No. 3,074,842, issued Jan. 22, 1963, to Strong, wherein pulp, in the form of fibrous clusters or fluffed up in flocs is treated in a zone countercurrently to the flow of chlorine gas with a contact time which may be in the order of mere fractions of a second. The patentee teaches that substantially all the gas will have been utilized during passage through the reaction zone, since the reaction is carried out using only the theoretical amount of gaseous reagent. Immediately after the chlorination reaction, repulping wash water is at once added.

Actually, there is no "theoretical" or stoichiometric quantity of chlorine which will react with lignin and other encrustants in vegetable matter such as unbleached wood pulp. The action of chlorine on such material is a complex one and involves several types of reaction progressing at different rates. Such material, when exposed to chlorine, whether in the gaseous state or in aqueous solution, consumes chlorine at first at a rapid rate, then at a diminishing rate, but continues to consume chlorine for several hours at a measurable rate. There is therefore no endpoint to the reaction and no "theoretical" consumption. The so-called "chlorine demand" of pulp is measured by exposing the pulp under empirically standardized conditions to chlorine or other oxidizing agent; there are a number of such test procedures and, although none is in universal use, they give results of comparable magnitude. In the description which follows, the term "potential consumption," is therefore used, in preference to "theoretical consumption" in the sense of the quantity of chlorine consumed by pulp as determined by one or other accepted test methods.

A difficulty of Strong's procedure is due to the fact that the potential amount of chlorine cannot be accurately ascertained unless complex programming and continuous analysis equipment is used. This is because each pulp is different and in fact the character of the pulp could vary from hour to hour. Thus, in order to use the potential quantity of chlorine, one must continuously determine the amount of chlorine needed for the particular pulp being chlorinated at that time and then, based on that determination, continuously meter the required amount of chlorine. Thus, unless the amount of chlorine was instantaneously exact, either insufficient chlorine would be used, or excess chlorine would be used which is wasteful since it is not recovered when the repulping wash water is added.

An object of one broad aspect of this invention is the provision of a process for the carrying out of a reaction between a solid and a fluid.

An object of another aspect of this invention is the provision of a process for carrying out the reaction between chlorine and vegetable matter in a very short time, thereby making possible the use of equipment of much smaller size and lower capital cost than that conventionally used.

An object of another aspect of this invention is the provision of a process for ensuring either complete consumption of the chlorine supplied, or recovery of unreacted chlorine and thereby to minimize wastage.

An object of yet another aspect of this invention is the provision of a process for reducing the quantity of chlorine required per unit weight of vegetable matter to achieve a given degree of delignification and thereby to reduce the cost of the treatment.

An object of still another aspect of this invention is the provision of a process for ensuring uniformity of treatment of the vegetable matter and to provide ease and precision of control of the treatment.

By a broad aspect of the present invention, a process is provided for the treatment of a solid with a fluid comprising: continuously passing that solid in a form in which it can readily react with said fluid through a first zone of an atmosphere containing excess said fluid; limiting the residence time of that solid within the first zone to such an extent that less than the potential amount of that fluid is acquired by that solid; and continuously passing that solid, including the acquired fluid, through a second zone of an atmosphere essentially free of that fluid under such retention time conditions as to allow the unreacted amount of the acquired fluid to react with that solid.

By another broad aspect of this invention, a process is provided for the treatment of vegetable matter which comprises: (a) continuously passing the vegetable matter in the form of a moist "fluff" through a first zone of an atmosphere containing excess chlorine; (b) limiting the residence time within the first zone to such an extent that less than the potential amount of the chlorine is acquired by the fluff; and (c) continuously passing the fluff, including the acquired chlorine, through a second zone of an essentially chlorine-free atmosphere under such retention time conditions as to allow the unreacted amount of the acquired chlorine to react with the fluff.

In a preferred embodiment of this aspect of the present invention a process is provided in which the residence time in the first zone is of the order of 20 seconds to 5 minutes.

In another preferred embodiment of this aspect of the present invention a process is provided in which from 60–80% of the potential amount of chlorine is acquired by the fluff.

In still another preferred embodiment of this aspect of the present invention a process is provided in which the retention time in the second zone is from 1–15 minutes.

In the accompanying drawings.

Figure 1:
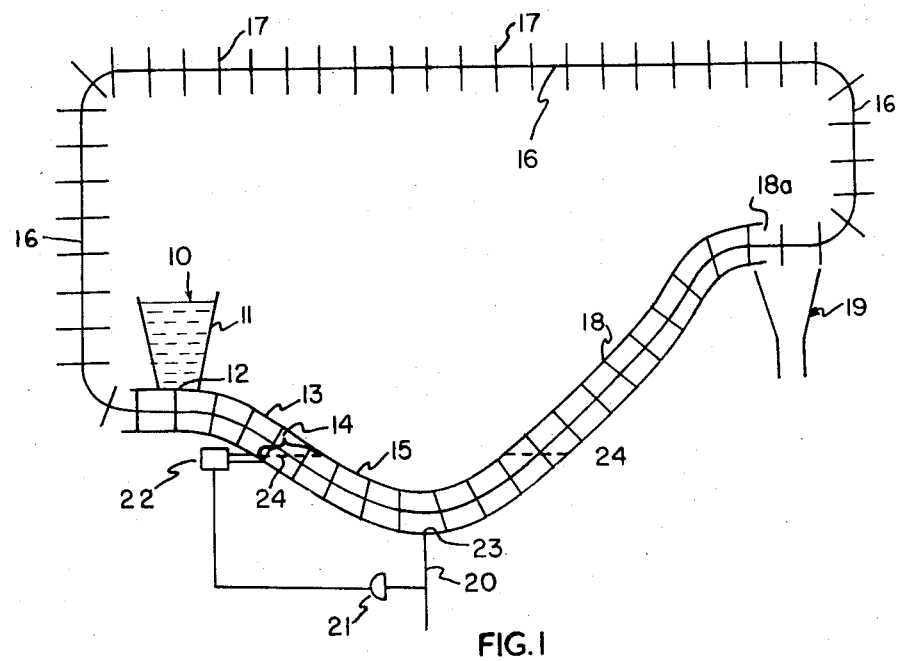
FIG. 1 is a diagrammatic vertical cross-section of a broad embodiment of the apparatus adapted for carrying out the process of one aspect of the present invention.

A brief description of the broad process of the present invention will now be given using, as an example, the chlorination of wood pulp.

Pulp is first brought to a moist condition, usually by pressing from a wet condition, where the quantity of moisture accompanying the pulp lies between the limits of four parts of moisture to one part of dry pulp and one part of moisture to two parts of dry pulp. Four parts of moisture to one part of dry pulp indicates a consistency of 20% and one part of moisture to two parts of dry pulp indicates a consistency of 67%. The desired moisture content may of course be reached by adding water to pulp at a moisture content below the desired level. The moisture content to which any given pulp is brought is governed by the "hardness" or lignin content of that pulp. The reaction of chlorine with lignin is highly exothermic and therefore during the treatment of moist pulp with gaseous chlorine the temperature of the mass rises. A modest temperature rise of ten or even twenty degree centigrade, above room temperature, is acceptable, but, if the rise of temperature exceeds this substantially, cellulose is degraded by the hydrochloric acid formed in the reaction and pulp deterioration results. Therefore, sufficient moisture should accompany the pulp to absorb the heat generated and to limit the temperature rise during reaction. The temperature rise is obviously related to the lignin content of the pulp. Thus "hard" pulps, that is those containing much lignin, should be treated at high moisture content, whereas "soft" pulps of low lignin content may be treated at low moisture.

The moist pulp is now comminuted or "fluffed" into fibrous clusters or flocs by means of any suitable equipment which will separate the pulp into particles which, ideally, should be single fibres but may range from single fibres to loose fibre agglomerates preferably not more than one-half inch in their greatest dimension.

The fluffed pulp is now moved into and through a first zone in which there is an atmosphere either of substantially pure chlorine gas or of chlorine gas mixed with a controlled proportion of inert gas. Depending on the extent of treatment desired, the residence time of the pulp in the reaction zone is regulated and limited to be between 20 seconds and 5 minutes.

Following the predetermined residence time in the first zone, the pulp may then be treated in one of two ways.

In the first alternative, the pulp passes from the reaction zone to a second zone and the retention time in which the pulp is allowed within said zone ranges from 1 to 15 minutes, sufficient for unreacted chlorine accompanying the pulp leaving the first zone to react with the pulp and become substantially exhausted. Air has free access to the second zone so as to replace the chlorine disappearing by reaction with the pulp.

In the second alternative, the pulp passes from the first zone into a purging zone in which air or other inert gas is passed through the pulp to remove from it unreacted chlorine. In this case, the mixture of unreacted chlorine and air or inert gas is led to a prechlorination zone through which the pulp is made to pass before entering the first zone; the function of the prechlorination zone is to strip the mixture of chlorine and air or inert gas of chlorine, thereby utilizing it and preventing wastage.

In either alternative, the pulp issuing from the second zone in the first case, or from the purging zone in the second, passes on to further known processing steps, usually water-washing followed by thickening and alkaline extraction.

Referring to the drawings, FIG. 1 which is a diagrammatic side elevation of one form of apparatus, shows, a hopper 11, fed with pulp 10, connected to the inlet 12 of a curved conduit 13 which is the extension of the inlet 14 to the reaction or first zone 15. An endless conveyor 16 driven by means not shown, provided with a plurality of foraminous flight bars 17 passes through conduit 13, reaction zone 15 and after-chamber 18. At the outlet 18a of after-chamber 18 is a hopper 19 which is connected to the subsequent treating stages.

The reaction zone 15 is provided with a chlorine inlet line 20 provided with a valve 21. A sensing device 22 such as a katharometer is provided at the inlet of first zone 15 and it is connected to the valve 21.

Chlorine gas is introduced at or near the lowest point 23 of the reaction zone 15 at a rate such as to maintain a high and predetermnied concentration of chlorine at a level 24, which concentration is measured by sensing device 22 which controls the rate of chlorine feed by means of control valve 21.

Pulp 10 entering through hopper 11 meets an atmosphere of chlorine at level 24, reacts therewith and, after a predetermined time established by the controlled rate of motion of conveyor 16, emerges from the chlorine atmosphere again at about level 24, into the after chamber 18. From this level 24 to the outlet of the conduit at 18, the distance, i.e., length of chamber 18, is such as to ensure sufficient retention time substantially to exhaust unreacted chlorine accompanying or acquired by the pulp emerging from level 24. At the outlet 18a, the treated pulp drops into hopper 19 and from there to subsequent processing.

Figure 2:
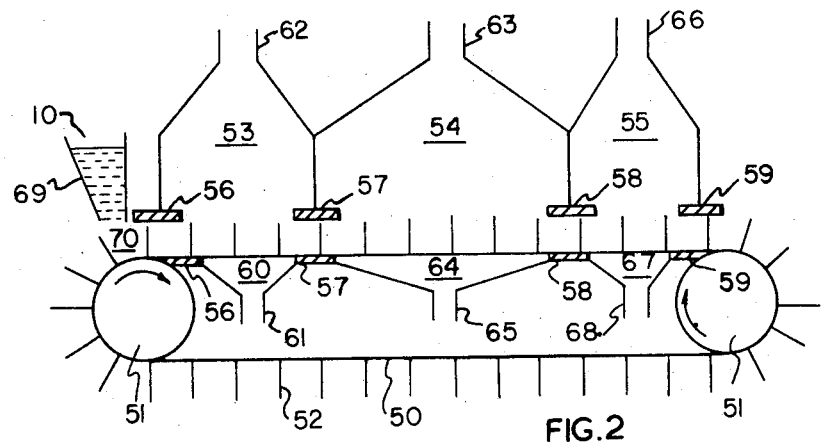
FIG. 2 is a vertical cross-section of another embodiment of an apparatus adapted for carrying out the process of one aspect of the present invention.

An alternative embodiment is shown in FIG. 2 in which are provided rollers 51 (driven by means not shown), entraining an endless foraminous belt 50. The belt 50 is provided with a plurality of spaced apart impervious flight bars 52. Straddling the belt 50 are three tandemly oriented chambers 53, 54 and 55. Chamber 53 is maintained sealed at its solids feed inlet by sealing strips 56 and a corresponding flight bar 52; and at its solids outlet (also serving as the solids inlet for chamber 54) by sealing strips 57 and a corresponding flight bar 52. Chamber 54 is maintained sealed at its solids outlet (and also the solids inlet for chamber 55) by sealing strips 58 and a corresponding flight bar 52. Chamber 55 is maintanied sealed at its solids outlet by sealing strips 59 and its corresponding flight bar 52.

Chamber 53 is provided with a lower gaseous feeding subchamber 60 provided with gas inlet means 61. Chamber 53 is provided with gas venting means 62.

Chamber 54 is provided with gas outlet means 63, which is connected to gas inlet means 61. Also chamber 54 is provided with a lower gaseous feeding sub-chamber 64 provided with gas inlet means 65.

Chamber 55 is provided with a gas outlet means 66 which is connected to gas inlet means 61. Also, chamber 55 is provided with a lower gaseous feeding subchamber 67, provided with gas inlet means 68.

A hopper 69 is provided at the upstream end of conveyor 50, to be fed by pulp 10 metered therein.

Fluffed pulp 10 is metered into hopper 69 from which it drops into the pockets 70 formed between the flight bars 52 of conveyor 50 disposed horizontally Chlorine gas is introduced into chamber 64 through inlet 65 under a pressure at least sufficient to percolate through the bed of fluffed pulp in the pockets 70 of the conveyor and emerge from the bed at a small velocity. The gas in chamber 54, composed of unreacted chlorine and air displaced from the pulp bed are exhausted through bent outlet 63 and fed, (by means of a fan not shown), into chamber 60 through inlet 61. Air (or other purging gas) is introduced into chamber 67 through inlet 68 and serves to purge the pulp in the pockets 70 free of unreacted chlorine. The purging air and entrained chlorine enter chamber 55 from which they are exhausted through outlet 66, and also conveyed (by a fan not shown) to chamber 60 through inlet 61. The combined air-chlorine mixtures from chambers 54 and 55 therefore enter chamber 60 in which pressure is maintained at a level sufficient to permit the gas mixture to flow through the pulp bed but not to fluidize it. In flowing through the pulp bed, the chlorine in the gas mixture reacts with the pulp and is stripped from the gas mixture so that air substantially free of chlorine enters chamber 53 and leaves it through exhaust vent 62.

Actually chamber 53 and exhaust pipe 62 are not essential and can be dispensed with. They are provided as safeguards during brief periods of start-up or malfunction during which chlorine might escape from the system; for this purpose, the exhaust gas from outlet 62 is led to a scrubber or other equivalent chlorine absorber (not shown). Chambers 60-53, 64-54, and 67-55 are proportioned in length so as to provide the desired relative retention time in the pre-chlorination, reaction, and air-washing zones respectively, and the speed of the conveyor 50 is regulated to provide the absolute retention times desired.

It will be noted that in the first form of apparatus, advantage is taken of the difference in density of chlorine gas and air. Also, both forms of apparatus eliminate the necessity of gravimetrically metering the quantity of chlorine supplied to the system as a fixed proportion of the pulp passing through it. Instead, control is obtained by regulating the retention time of the pulp in an atmosphere of chlorine, thereby making control of the process easier and more precise.

The method described above is based on and justified by various experiments of which examples are given below, which have established that: (1). Lignified vegetable matter, and specifically chemical wood pulp, in the moist condition react with and consume chlorine in the gaseous state very rapidly, taking up within one minute from 60-80 percent of the quantity of chlorine which they would ultimately consume on prolonged exposure.

EXAMPLE I

Table I shows the chlorine consumed by kraft and sulphite pulps characterized by different Roe chlorine numbers when fluffed at 70% moisture and exposed to an atmosphere of pure chlorine for 60 seconds.

TABLE I.—CHLORINE CONSUMED IN 60 SECONDS AT HIGH CONSISTENCY

| Pulp type | Roe chlorine No. | Kappa No. | Chlorine consumed, percent of Roe chlorine No. |
|---|---|---|---|
| Hardwood kraft | 1.08 | 12.7 | 80.5 |
| Softwood kraft | 3.8 | 24.2 | 73.7 |
| Do | 3.97 | 23.5 | 61.7 |
| Do | 4.0 | 21.8 | 62.5 |
| Do | 13.8 | 78.6 | 77.8 |
| Do | 15.1 | 80.3 | 70.6 |
| Softwood sulphite | 5.1 | 24.4 | 78.2 |
| Do | 7.9 | 33.0 | 74.6 |
| Do | 9.6 | 48.1 | 70.2 |
| Do | 25.3 | 128 | 75.3 |

An important finding, of which the present invention takes advantage, is that all chemical wood pulps tested, regardless of their lignin content, exhibit similar chlorine-consumption time relationships in that some 60 to 80% of their ultimate chlorine consumption is taken up within one minute when exposed in the moist condition to pure chlorine gas. This finding makes possible easy control of the process described herein by controlling the time of exposure of the pulp to chlorine gas instead of the relatively difficult metering of the desired weight of chlorine relative to the dry weight of pulp being treated in a given time.

(2) After exposure to chlorine gas for a restricted period of the order of one minute, and removal from the chlorine atmosphere, wood pulp will continue to consume the unreacted chlorine accompanying it at a rapid, albeit, decreasing rate corresponding to the decreasing concentration of chlorine in the ambient atmosphere and substantial exhaustion of residual unreacted chlorine will be reached in a short time of not more than 15 minutes.

EXAMPLE II

Samples of unbleached kraft pulp, Roe chlorine number 3.97, were chlorinated at 30% consistency for 60 seconds, then removed from the chlorine atmosphere but left for a designated retention period to consume unreacted chlorine. After various retention times in a closed vessel, unreacted chlorine was swept from the pulp for 10 minutes by a stream of air, absorbed in a solution of potassium iodide and determined by volumetric analysis. Immediately after the 60-second chlorination period, the air and the moisture accompanying the pulp contained unreacted chlorine equivalent to 0.195 percent of the dry weight of fibre. One minute later this value was reduced by 27.7 percent; after four minutes it was decreased by 36.4 percent; ten minutes after leaving the chlorine atmosphere the original value was lowered by 58.4 percent. In terms of practical operations, this is equivalent to substantial exhaustion of unreacted chlorination remaining with the pulp at the outlet of the first zone. The present example shows the behaviour of a "soft" pulp of low Roe number or lignin content; other evidence not reported here indicates that the rate of depletion of unreacted chlorine increases with increasing "hardness" of the pulp.

(3) Moist untreated chemical wood pulp, when exposed to an atmosphere of chlorine gas and air or an inert gas in which the concentration of chlorine is relatively low, will react with and consume the chlorine in the chlorine-gas mixture at a rapid rate and substantially strip the chlorine-gas mixture of chlorine in an exposure time of the order of 1 minute.

EXAMPLE III

Fluffed samples of the same kraft pulp at 30% consistency were exposed to chlorine gas diluted with air. One sample was treated with a chlorine gas-air mixture which contained one percent chlorine by volume, the equivalent of 13.6% of the Roe chlorine number. Within one minute the mixture was completely stripped of chlorine.

The other sample of unbleached pulp was exposed to a chlorine gas-air mixture which contained 5% chlorine by volume, the equivalent of 63.4% of the Roe chlorine number. Within one minute the mixture was stripped of 99.99% of chlorine.

(4) It has been found that, by exposing moist chemical wood pulp to gaseous chlorine under the conditions indicated above, then, as in conventional practice, water-washing the treated pulp and extracting with an alkaline solution, the reduction in lignin content, as characterized by Kappa number is higher for the gas phase chlorination than by the conventional chlorination in aqueous phase along with a substantial reduction in chlorine consumption.

EXAMPLE IV

Kraft pulp from coniferous wood characterized by Roe chlorine number 3.97 and Kappa number 23.5 was fluffed at 30% consistency. A sufficient quantity of this pulp was exposed for one minute to an atmosphere of pure chlorine, containing chlorine in excess of the Roe chlorine number. After the restricted period the pulp was removed, the unreacted chlorine remaining in the reaction vessel was absorbed in potassium iodide solution and determined volumetrically. Chlorine consumed amounted to 62.2% of the Roe chlorine number. The chlorinated pulp was washed with water, heated at 60° C. for one hour with aqueous sodium hydroxide solution containing 2% of NaOH on the weight of pulp, and again washed with water. This chlorinated and extracted pulp had a Kappa number 6.7.

Another portion of the same unbleached kraft pulp was dispersed in water; chlorine water containing the equivalent of 100% of the Roe chlorine number was mixed with the pulp suspension. The volume of water and chlorine water reduced the consistency of the pulp to 3%. The mixture was kept in a closed vessel at 27° C. for one hour. The chlorinated pulp was washed, treated with caustic soda, as described above, and then re-washed. The Kappa number after alkaline extraction was 10.3.

Sulphite pulp from coniferous wood characterized by a Roe chlorine number 7.9 and Kappa number 33, was fluffed at 30% consistency. A sufficient quantity of this pulp was exposed for one minute to an atmosphere of pure chlorine, containing chlorine in excess of the Roe chlorine number. Chlorine consumed amounted to 74.6% of the Roe chlorine number. The chlorinated pulp was washed with water, heated at 60° C. for one hour with an aqueous sodium hydroxide solution containing 2.5% of NaOH on the weight of pulp, and again washed with water. This chlorinated and extracted pulp had a Kappa number 1.0.

Another portion of the same unbleached sulphite pulp was dispersed in water; chlorine water containing 75% of the Roe chlorine demand was mixed with the pulp suspension. The volume of water and chlorine water reduced the consistency of the pulp to 3%. The mixture was kept in a closed vessel at 25° C. for one hour to exhaust the chlorine supplied. The chlorinated pulp was washed, treated with caustic soda, as described above, and then re-washed. The Kappa number after alkaline extraction was 6.9.

We claim:
1. A process for bleaching an unbleached cellulosic pulp which comprises:
continuously passing said pulp at a high consistency of from 20% to 67% and in the form of fluffed fibers and fiber flocks through a first zone in which said pulp is contacted with gaseous chlorine in excess of the potential chlorine consumption of said pulp;
holding said pulp in said zone from about 20 seconds to about 5 minutes and sufficient for said pulp to absorb only 60 to 80% of the potential chlorine consumption;
passing said pulp containing said absorbed chlorine essentially at the same consistency as in said first zone in said fluffed form to a second zone essentially free from gaseous chlorine for consumption of the free unreacted chlorine in said pulp; and
holding said pulp in said second zone for a period of time sufficient for unreacted chlorine in said pulp to react therewith.

2. A process as claimed in claim 1 in which said pulp in said second zone is purged with a gas inert to chlorine to remove the unreacted chlorine therefrom.

3. A process as claimed in claim 2 in which said gas is air, forming a mixture of air and chlorine, said mixture of air and chlorine being recycled to a prechlorination zone in which said mixture is contacted with unbleached chemical cellulosic pulp before passage thereof to said first zone.

4. A process as claimed in claim 1 in which said pulp has a consistency of about 30%.

5. A process as claimed in claim 1 in which said pulp is held in said first zone from 20 seconds to 1 minute.

6. A process as claimed in claim 1 in which said pulp is held in said second zone from 1 to 15 minutes.

References Cited

UNITED STATES PATENTS

| | | | |
|---|---|---|---|
| 1,960,613 | 5/1934 | Wolf et al. | 162—87X |
| 2,730,426 | 1/1956 | Becker | 162—88X |
| 3,492,199 | 1/1970 | Kindron et al. | 162—71 |

FOREIGN PATENTS

| | | | |
|---|---|---|---|
| 56,032 | 1/1936 | Norway | 162—66 |

HOWARD R. CAINE, Primary Examiner

A. L. CORBIN, Assistant Examiner

U.S. Cl. X.R.

8—108; 162—87, 88